(12) United States Patent
Narayanasamy et al.

(10) Patent No.: US 7,821,775 B2
(45) Date of Patent: Oct. 26, 2010

(54) RACKING MECHANISM FOR A CIRCUIT BREAKER

(75) Inventors: Soundararajan Narayanasamy, Hyderabad (IN); Janakiraman Narayanan, Andra Pradesh (IN); Yatin Vilas Newase, Maharashtra (IN); Partha Sarathy Doddapadam Srinivasa Raghavachar, Karnataka (IN)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 12/103,087

(22) Filed: Apr. 15, 2008

(65) Prior Publication Data

US 2009/0255790 A1 Oct. 15, 2009

(51) Int. Cl.
*H02B 11/127* (2006.01)
*H01H 9/20* (2006.01)

(52) U.S. Cl. .................. 361/609; 361/605; 361/608; 361/615; 200/50.21; 200/50.24; 200/50.25

(58) Field of Classification Search ......... 361/605–609; 200/50.21, 50.24–50.26
See application file for complete search history.

(56) References Cited

U.S. PATENT DOCUMENTS

| 2,776,346 | A | * | 1/1957 | Stewart et al. ........... 200/50.24 |
| 4,205,207 | A | | 5/1980 | Clausing |
| 4,427,854 | A | | 1/1984 | Kleinecke et al. |
| 4,743,715 | A | | 5/1988 | Gerbert-Gaillard et al. |
| 4,761,521 | A | | 8/1988 | Beck et al. |
| 4,773,870 | A | | 9/1988 | Sinnig |
| 4,884,047 | A | | 11/1989 | Baginski et al. |
| 4,950,848 | A | | 8/1990 | Maier et al. |
| 5,036,427 | A | | 7/1991 | Krom et al. |
| 5,278,722 | A | | 1/1994 | Peruso |
| 5,309,317 | A | | 5/1994 | Ishikawa |
| 5,334,808 | A | | 8/1994 | Bur et al. |
| 5,912,444 | A | | 6/1999 | Godesa |
| 5,955,716 | A | | 9/1999 | Thuries et al. |
| 6,005,208 | A | * | 12/1999 | Castonguay ................. 200/308 |
| 6,031,192 | A | | 2/2000 | Liebetruth |

(Continued)

FOREIGN PATENT DOCUMENTS

| CN | 101626148 | A | * | 1/2010 |
| EP | 620625 | A1 | | 4/1994 |
| EP | 896411 | A2 | | 7/1998 |
| EP | 1460727 | A2 | | 9/2004 |
| JP | 4244709 | A | | 1/1992 |

(Continued)

*Primary Examiner*—Jayprakash N Gandhi
*Assistant Examiner*—Robert J Hoffberg
(74) *Attorney, Agent, or Firm*—Global Patent Operation; Stephen G. Midgley

(57) ABSTRACT

Disclosed is a racking mechanism for a drawout circuit breaker including a cross shaft movably positioned in an enclosure and at least one input link in operable communication with the cross shaft via at least one connecting link. At least one racking cam is movably positioned in the enclosure and is in operable communication with the input link. Each racking cam has at least one cam slot receptive of a portion of the circuit breaker. Movement of the cross shaft about an axis of the cross shaft is capable of moving the at least one racking cam from an open position toward a closed position with the portion of the circuit breaker disposed in the at least one cam slot, thereby securing the circuit breaker in the enclosure and the at least one racking cam is in the closed position. A method for securing a circuit breaker in an enclosure and a circuit breaker assembly are also disclosed.

25 Claims, 6 Drawing Sheets

U.S. PATENT DOCUMENTS

| | | | | |
|---|---|---|---|---|
| 6,160,228 A | * | 12/2000 | Gerbert-Gaillard et al. | 200/50.21 |
| 6,160,229 A | * | 12/2000 | Grelier et al. | 200/50.26 |
| 6,177,641 B1 | | 1/2001 | Morel et al. | |
| 6,184,483 B1 | * | 2/2001 | Coudert et al. | 200/50.26 |
| 6,265,678 B1 | * | 7/2001 | Robbins et al. | 200/50.21 |
| 6,291,783 B1 | * | 9/2001 | Nebon et al. | 200/50.26 |
| 6,313,424 B1 | | 11/2001 | Bachofen | |
| 6,642,463 B1 | | 11/2003 | Turner | |
| 6,759,617 B2 | | 7/2004 | Yoon | |
| 6,777,627 B1 | | 8/2004 | Stevenson | |
| 2001/0022262 A1 | | 9/2001 | Rane et al. | |
| 2004/0095047 A1 | | 5/2004 | Salice | |
| 2005/0039938 A1 | | 2/2005 | Radosavlevic et al. | |
| 2006/0049026 A1 | | 3/2006 | Weister et al. | |
| 2009/0015990 A1 | * | 1/2009 | Kim et al. | 361/608 |
| 2009/0257174 A1 | * | 10/2009 | Rane et al. | 361/673 |
| 2010/0025204 A1 | * | 2/2010 | Sapuram et al. | 200/50.25 |

FOREIGN PATENT DOCUMENTS

| | | |
|---|---|---|
| JP | 4200209 A | 7/1992 |
| JP | 4200210 A | 7/1992 |
| JP | 4364311 A | 12/1992 |
| JP | 7274324 A | 10/1995 |
| JP | 2005261044 A2 | 9/2005 |

* cited by examiner

RACKING MECHANISM FOR A CIRCUIT BREAKER

BACKGROUND

The subject invention relates to circuit breakers. More particularly, the subject invention relates to racking mechanisms for draw out circuit breakers.

Draw out circuit breakers often include a mechanism for drawing the breaker in and connecting the breaker to corresponding electrical contacts. The mechanism is reversed to disconnect the circuit breaker from the electrical contacts when, for example, maintenance is performed along an electrical network to which the circuit breaker is connected. Typical racking mechanisms often require a high force be applied to rack the circuit breaker, and the amount of force necessary often increases as the number of electrical contacts to be engaged increases. As the number of contacts is increased, the force that, for example, a technician must apply to actuate a typical racking mechanism may exceed ergonomic limitations.

Further, during fault situations, a typical racking mechanism often allows the circuit breaker to be pushed out and disconnected from the electrical contacts as a result of electromotive forces occurring during the fault.

BRIEF DESCRIPTION OF THE INVENTION

A racking mechanism for a drawout circuit breaker includes a cross shaft movably positioned in an enclosure and at least one input link in operable communication with the cross shaft. At least one racking cam is movably positioned in the enclosure and is in operable communication with the input link via at least one connecting link. Each racking cam has at least one cam slot receptive of a portion of a circuit breaker. Movement of the cross shaft about a cross shaft axis is capable of moving the at least one racking cam from an open position toward a closed position with the portion of the circuit breaker disposed in the at least one cam slot, thereby securing the circuit breaker in the enclosure.

A method for securing a circuit breaker into an enclosure includes moving a cross shaft disposed in the enclosure about a cross shaft axis and moving at least one input link, the at least one input link operably connected to the cross shaft, via movement of the cross shaft. At least a portion of the circuit breaker is engaged in a cam slot of the at least one racking cam. The at least one racking cam is moved from an open position toward a closed position, the at least one racking cam operably connected to the at least one input link, via movement of the at least one input link. The circuit breaker is secured to a connection face via movement of the racking cam.

A circuit breaker assembly includes an enclosure, a circuit breaker insertable in the disclosure; and a racking mechanism. The racking mechanism includes a cross shaft movably positioned in the enclosure and at least one input link is in operable communication with the cross shaft. At least one racking cam is movably positioned in the enclosure and is in operable communication with the input link. Each racking cam has at least one cam slot receptive of a portion of the circuit breaker. Movement of the cross shaft about a cross shaft axis is capable of moving the at least one racking cam from an open position toward a closed position with the portion of the circuit breaker disposed in the at least one cam slot, thereby securing the circuit breaker in the enclosure.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
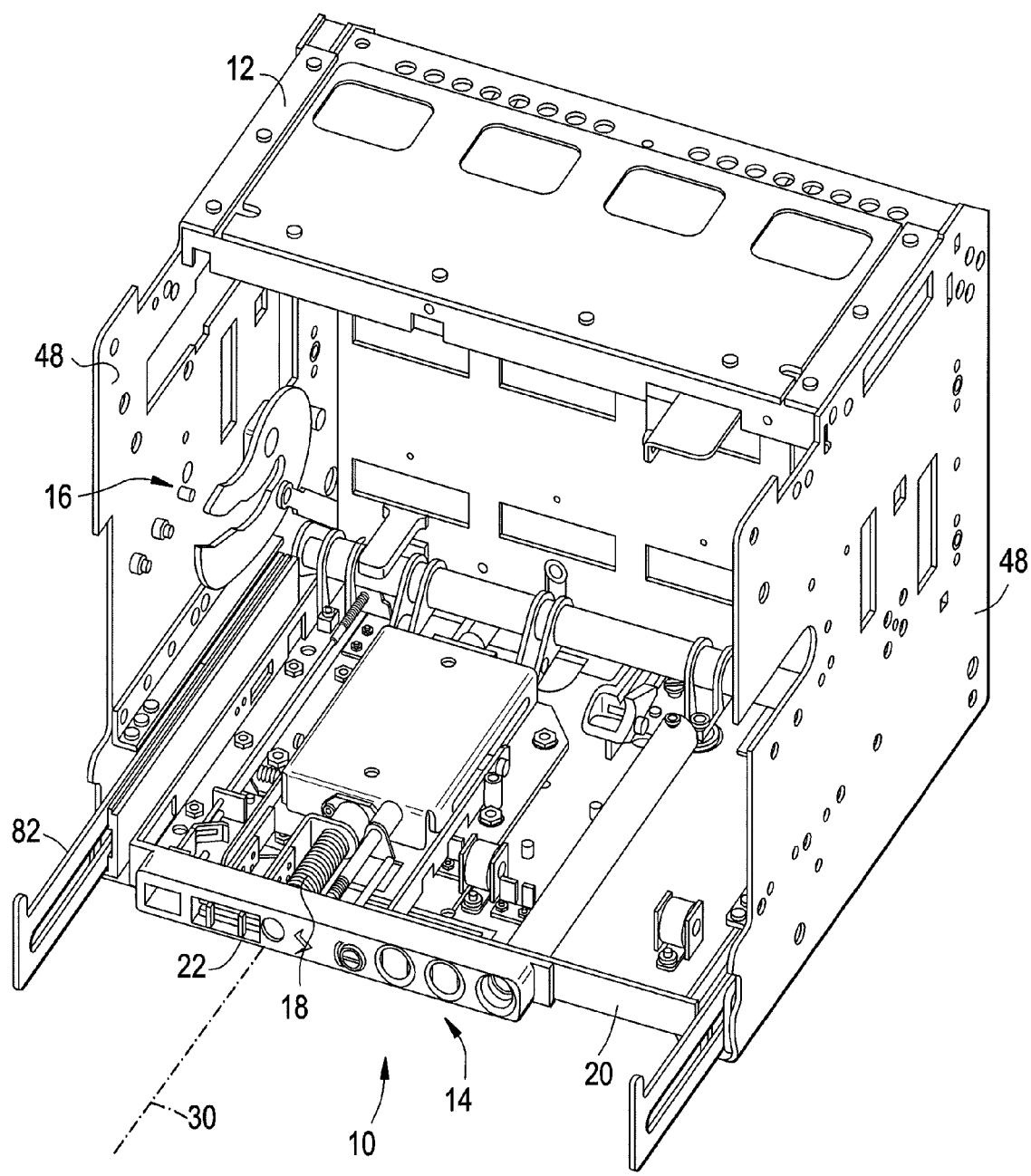
FIG. 1 is a perspective view of an embodiment of a racking mechanism for a circuit breaker.
Figure 2:
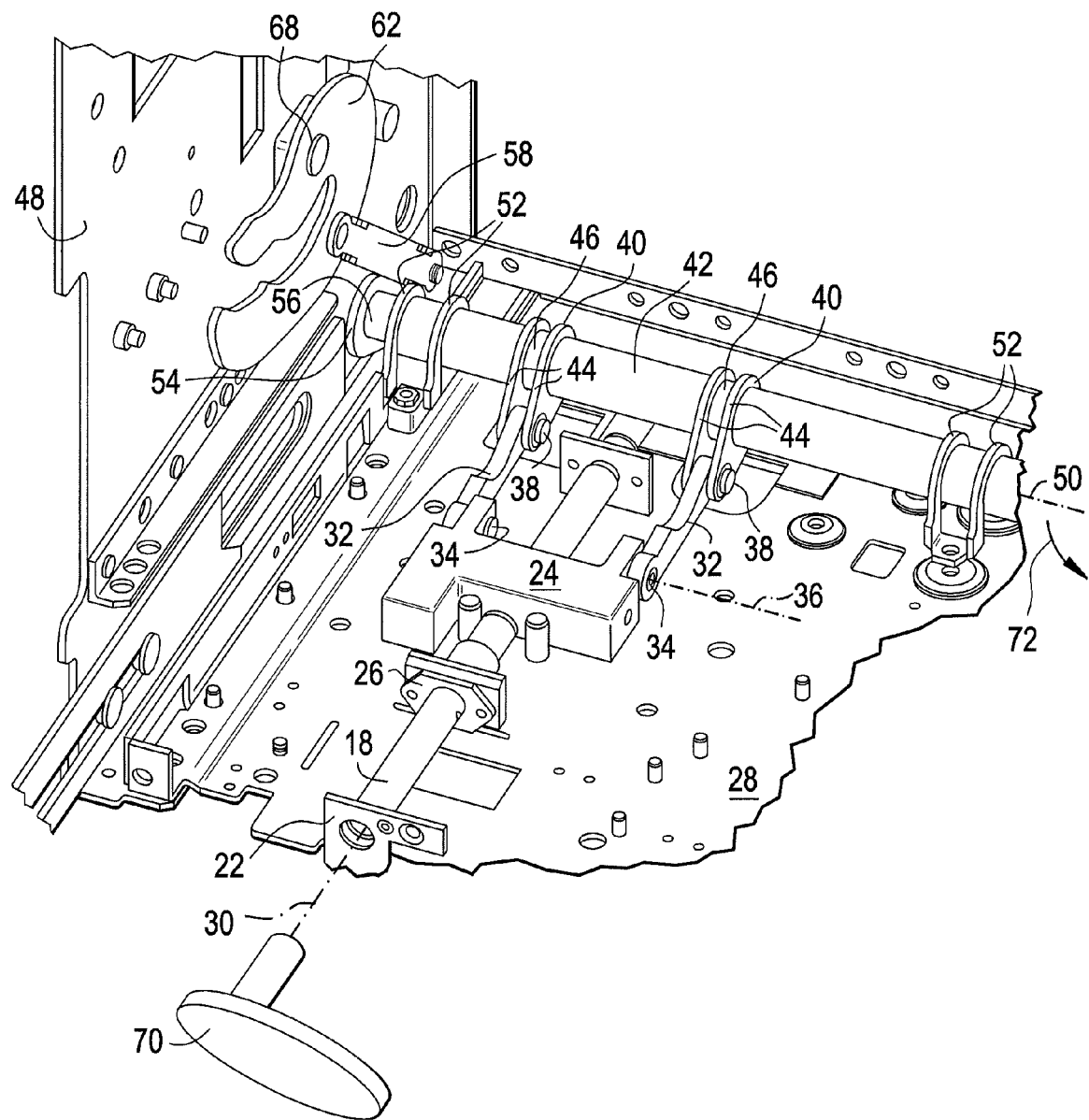
FIG. 2 is an enlarged view of a portion of the racking mechanism of FIG. 1.

Shown in FIG. 1 is an embodiment of a racking mechanism 10 disposed in a draw out circuit breaker cassette 12. The racking mechanism 10 includes a drive unit 14 and a locking unit 16. The drive unit 14 of the embodiment shown in FIG. 1 includes a racking screw 18 extending into the cassette 12 from a cassette face 20 through a cassette face hole 22. Referring now to FIG. 2, the racking screw 18 is connected to a screw bearing 24. Between the cassette face 20 and the screw bearing 24, the racking screw 18 may pass through one or more supports 26 to maintain alignment of the racking screw 18. The screw bearing 24 is slidably disposed at a cassette base 28, and transfers rotational motion of the racking screw 18 into linear motion of the screw bearing 24 along, for example, racking screw axis 30. The screw bearing 24 is connected to one or more connecting links 32 by, for example, a connecting pin 34. The connecting pin 34 allows for relative rotative movement of the connecting link 32 and the screw bearing about a pin axis 36. The embodiment illustrated in FIG. 2 includes two connecting links 32, but it is to be appreciated that other quantities of connecting links 32, for example, one or three connecting links 32 may be utilized.

Each connecting link 32 is in turn rotatably connected via, for example, a link pin 38 to a lobe shaped crank 40 which is fixed to a cross shaft 42. In the embodiment of FIG. 2, each crank 40 includes one or more crank plates 44 disposed at the cross shaft 42 and the corresponding connecting link 32 is inserted into a crank gap 46 between the crank plates 40. The cross shaft 42 is transversely positioned in the cassette 12 and extends between cassette sidewalls 48. In some embodiments, a shaft axis 50 is perpendicular to the racking screw axis 30. The cross shaft 42 is positioned in one or more shaft guides 52 which retain the cross shaft 42, but allow for rotation of the cross shaft 42 about the shaft axis 50.

Figure 3:
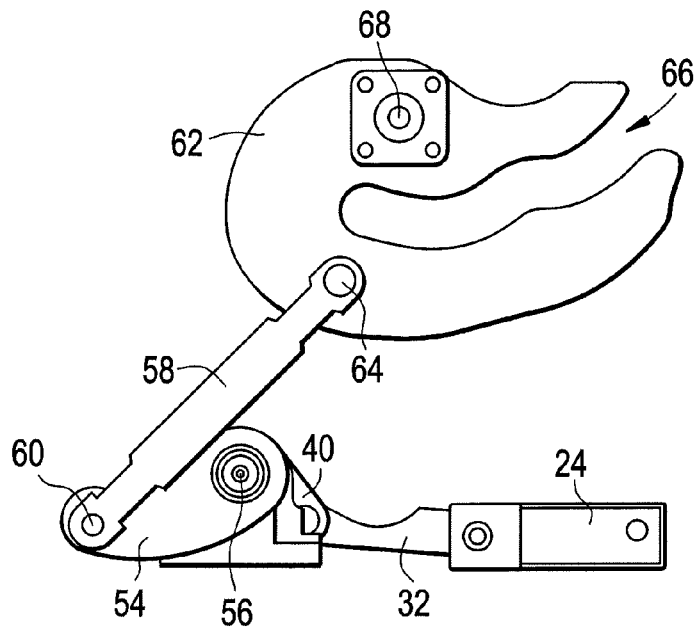
FIG. 3 is side view of the racking mechanism of FIG. 1 in an open position.
Figure 4:
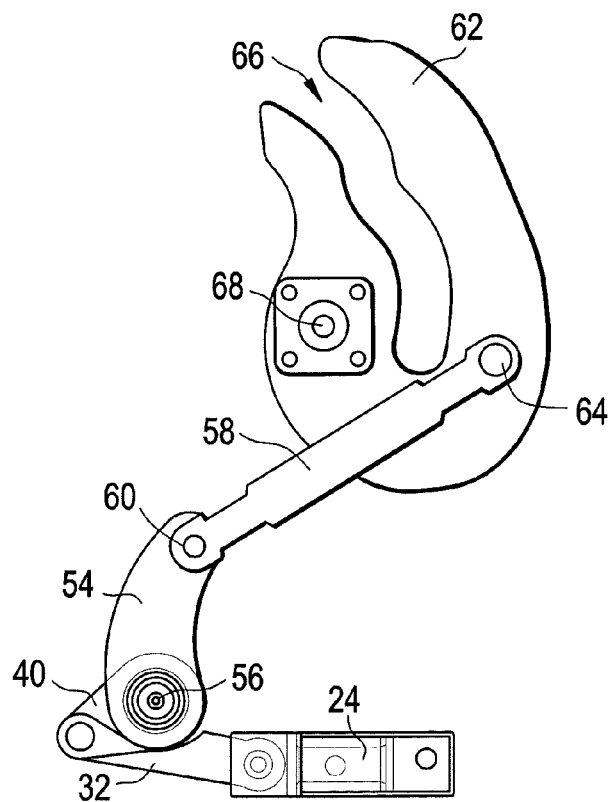
FIG. 4 is a side view of the racking mechanism of FIG. 1 in a closed position.

Each locking unit 16 includes an input link 54 connected at a shaft end 56 to the cross shaft 42. As shown best in FIG. 3, the input link 54 is pivotably connected to a transfer link 58 at a transfer pivot 60. The transfer link 58 is pivotably connected in turn to a racking cam 62 at a link pivot 64. The racking cam 62 is pivotably fixed to cassette sidewall 48 as shown in FIG. 2. The racking cam 62 includes a cam slot 66. The cam slot 66 is configured such that when the when the racking cam 62 rotates about a cam pivot 68, the cam slot 66 rotates from an open position, shown in FIG. 3, to a closed position as shown in FIG. 4. As shown in FIG. 4, the racking mechanism 10 may include two locking units 16, but it is to be appreciated that other quantities of locking units 16, for example 1 locking unit 16 may be utilized.

Referring again to FIG. 2, the racking mechanism 10 is driven by rotation of the racking screw 18. In some embodiments, the racking screw 18 includes a hex-shaped recess (not shown) onto which a racking handle 70 having a hex-shape head is placed. The racking handle 70 is rotated, causing the racking screw 18 to rotate. The rotation of the racking screw 18 drives the screw bearing 24 slidably along the racking screw axis 30 toward the cross shaft 42. The screw bearing 24 pushes the connecting links 32 which cause the cranks 40 to rotate the cross shaft 42 in a shaft rotation direction 72. Rotation of the cross shaft 42 causes each input link 54 to rotate in the shaft rotation direction 72 and the transfer link 58 rotates the racking cam 62 about the cam pivot 68.

Figure 5:
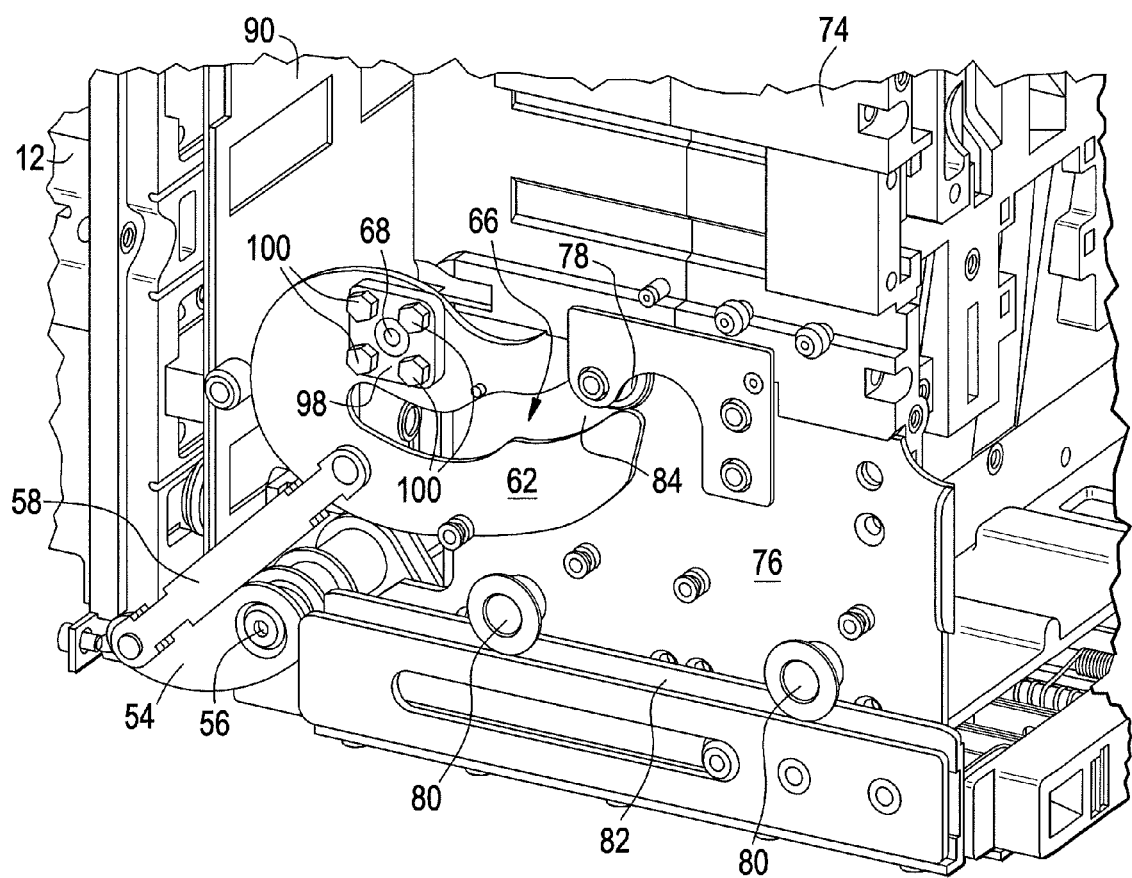
FIG. 5 is a side view of a circuit breaker inserted in the racking mechanism of FIG. 1.
Figure 6:
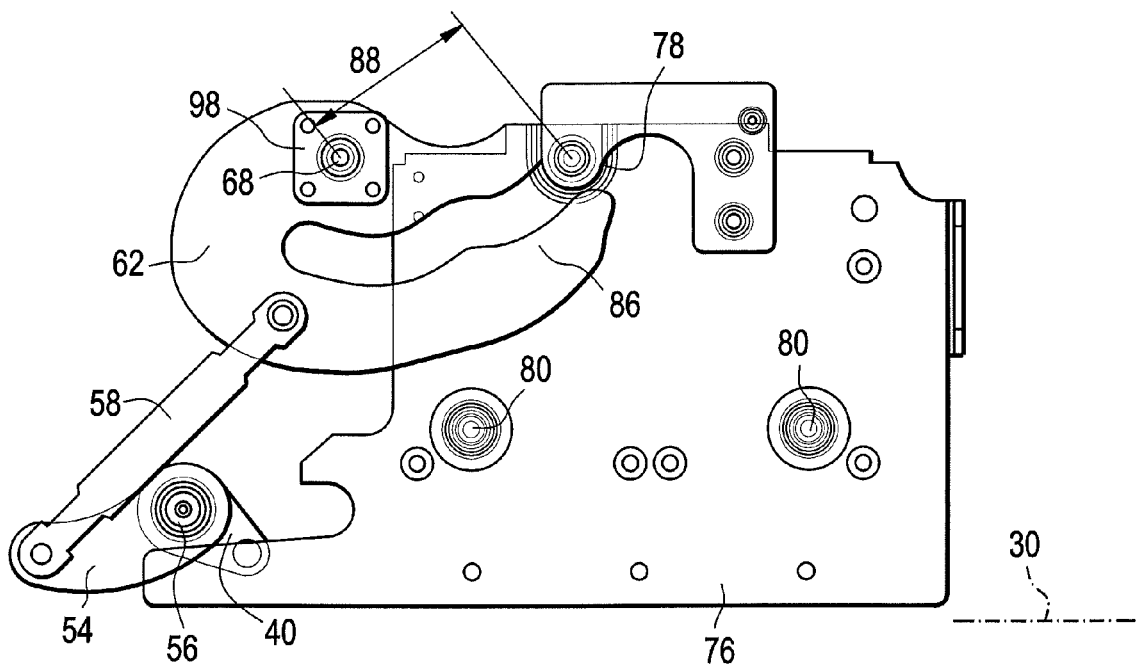
FIG. 6 is a side view of a circuit breaker disposed at a first profile of the cam slot of the racking mechanism of FIG. 1.

Referring to FIG. 5, the racking mechanism 10 is disposed and configured to secure a draw out breaker 74 in the cassette 12. The draw out breaker 74 has at least one side mounting plate 76. Each side mounting plate 76 includes a locking boss 78 which is receivable in the cam slot 66. In some embodiments, each side mounting plate 76 includes at least one wheel 80 disposed to slide or roll on a rail 82 located on the cassette sidewall 48. The at least one wheel 80 assists in guiding the draw out breaker 74 into proper position in the cassette 12 when the draw out breaker 74 is installed in the cassette 12. To connect the draw out breaker 74, the draw out breaker 74 is placed in the cassette 12 with the at least one wheel 80 disposed on the rail 82, and the locking boss 78 is at an entrance 84 to the cam slot 66. The racking screw 18 is rotated causing the racking cam 62 to rotate as described above. Referring now to FIG. 6, when the racking cam 62 is rotated, the locking boss 78 enters the cam slot 66 at a first profile 86. The first profile 86 has a moment arm 88 to accelerate the draw out breaker 74 along the racking screw axis 30 toward a connection face 90 under the influence of the racking screw 18 being rotated at a constant angular velocity.

Figure 7:
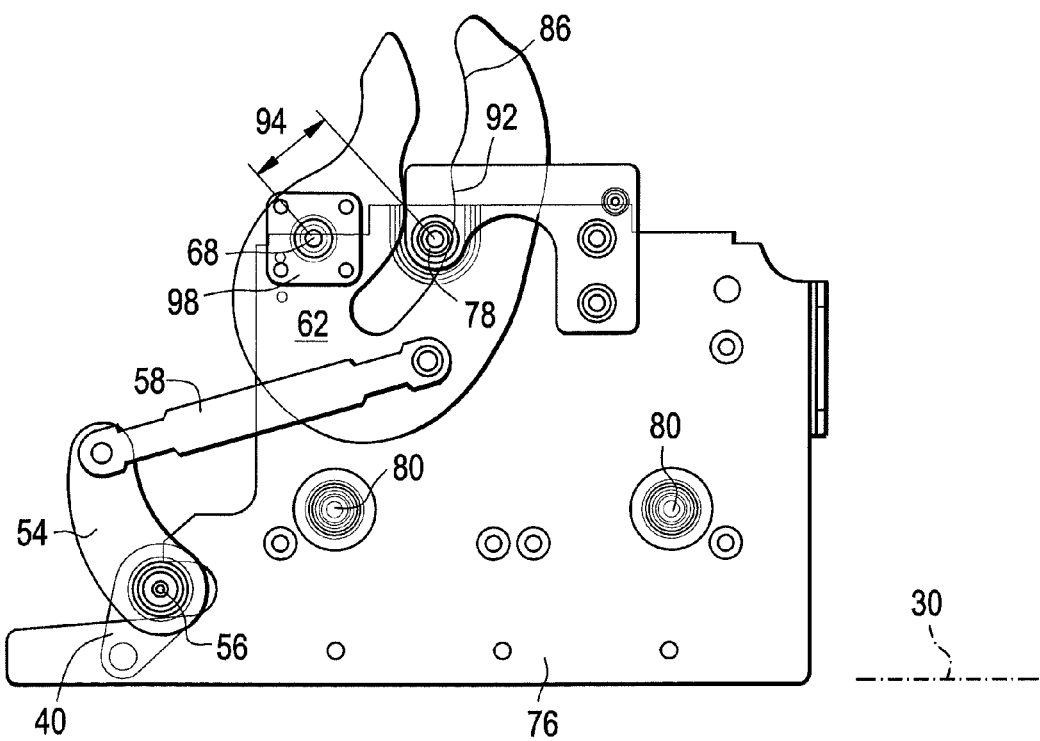
FIG. 7 is a side view of a circuit breaker disposed at a second profile of the cam slot of the racking mechanism of FIG. 1.
Figure 8:
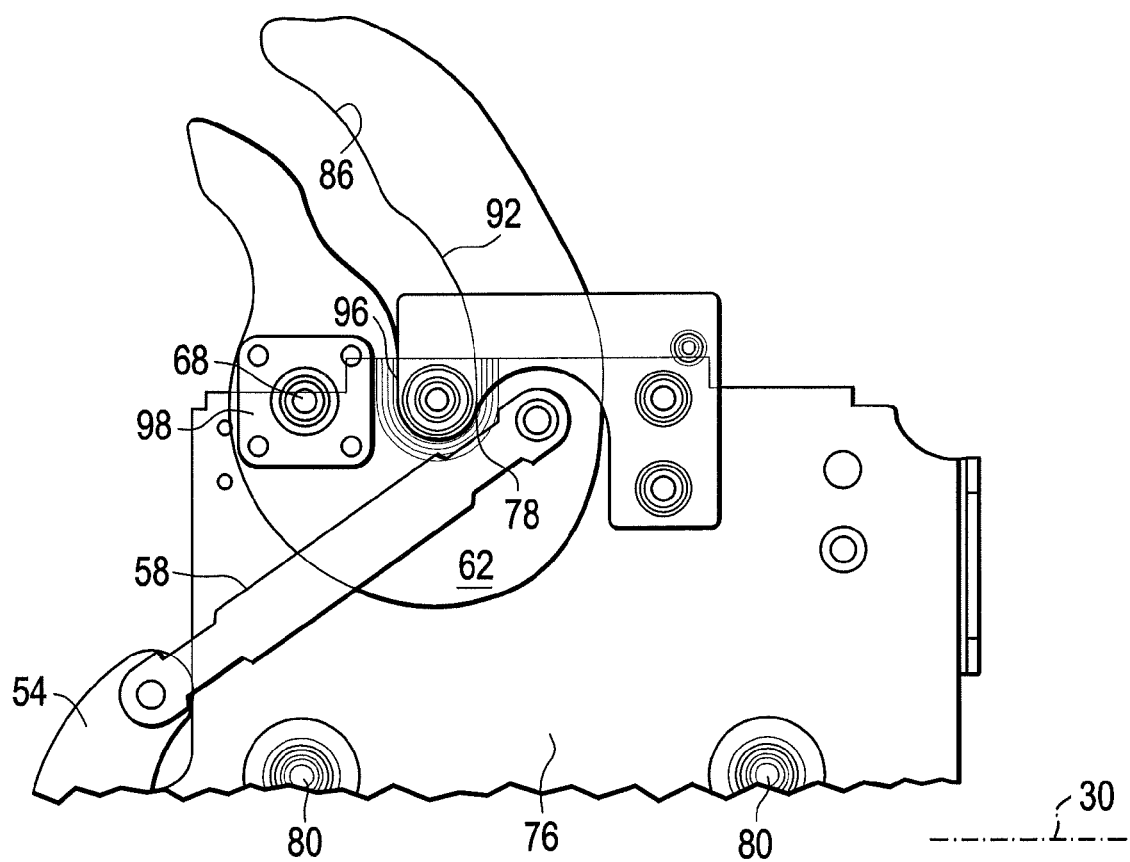
FIG. 8 is a side view of a circuit breaker disposed at a third profile of the cam slot of the racking mechanism of FIG. 1.

As shown in FIG. 7, as the racking cam 62 continues to rotate, the locking boss 78 enters a second profile 92 of the cam slot 66. The second profile 92 has a moment arm 94, which in some embodiments is shorter than moment arm 88 to engage the draw out breaker 74 to the connection face 90. As shown in FIG. 8, the cam slot 66 includes a third profile 96. When the draw out breaker 74 engages to the connection face 90, the locking boss 78 enters the third profile 96 which, when the draw out breaker 74 is engaged, is oriented substantially vertically with a moment arm that is shorter than the second moment arm 94. The vertically oriented third profile 96 of the cam slot 66 locks the draw out breaker 74 into the connected position by virtue of the line of force between third profile 96 and locking boss 78 being substantially directed toward cam pivot 68. If a fault is encountered and the draw out breaker 74 is subjected to high electromotive forces, the third profile 96 prevents the draw out breaker 74 from becoming disconnected from the connection face 90 and moving away from the connection face 90 along racking screw axis 30. To remove the draw out breaker 74 from the cassette 12, the racking screw 18 is rotated in an opposite direction to rotate the racking cam 62 from the closed position to the open position which forces the draw out breaker 74 away from the connection face 90.

In some embodiments, each racking cam 62 is connected to the cassette sidewall 48 via a cam mounting plate 98. The cam mounting plate 98 is removeably connected to the cassette sidewall 48 via at least one mechanical attachment, for example four mounting screws 100. Removing the cam mounting plate 98 allows for removal of the draw out breaker 74 from the cassette without disengaging the draw out breaker 74 via rotation of the racking cam 62 as described above. This is particularly useful in the case of an unexpected event, for instance if the draw out breaker 74 becomes welded to the connection face 90 during a fault event, in which case rotation of the racking cam 62 may not be able to force the draw out breaker 74 away from the connection face 90.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A racking mechanism for a drawout circuit breaker comprising: a cross shaft movably disposed in an enclosure; at least one input link in operable communication with the cross shaft and at least one transfer link; the at least one transfer link pivotably connected to the at least one input link; at least one racking cam rotatably disposed in the enclosure and pivotably connected with the transfer link, each racking cam having at least one cam slot receptive of a portion of the circuit breaker; and wherein a first movement of the cross shaft about a cross shaft axis causes a second movement of the at least one racking cam from an open position toward a closed position with the portion of the circuit breaker disposed in the at least one cam slot, thereby securing the circuit breaker in the enclosure when the circuit breaker is racked into the enclosure and the at least one racking cam is in the closed position.

2. The racking mechanism of claim 1 including a drive unit capable of moving the cross shaft.

3. The racking mechanism of claim 2 wherein the drive unit includes: a racking screw; and at least one screw bearing slidably disposed in the enclosure, the at least one screw bearing operably connected to the racking screw and the cross shaft, wherein a third movement of the racking screw about a racking screw axis urges the screw bearing along the racking screw axis, thereby moving the cross shaft about the cross shaft axis.

4. The racking mechanism of claim 3 wherein the racking screw axis is substantially perpendicular to the cross shaft axis.

5. The racking mechanism of claim 1 wherein the cam slot includes:
a first cam slot profile having a first moment arm, capable of accelerating the circuit breaker toward a connection face;

a second cam slot profile having a second moment arm shorter than the first moment arm, capable of engaging the circuit breaker with the connection face; and a third cam slot profile having a substantially zero moment arm, capable of locking the circuit breaker in a desired position.

6. The racking mechanism of claim 5 wherein the third cam slot profile is substantially perpendicular to the cross shaft axis when the racking cam is in the closed position.

7. The racking mechanism of claim 1 wherein the at least one racking cam is moveably fixed to the enclosure via a cam mounting plate.

8. The racking mechanism of claim 7 wherein the cam mounting plate is removably fixed to the enclosure wherein removal of the cam mounting plate from the enclosure allows for removal of the circuit breaker from the enclosure without movement of the at least one racking cam from the closed position toward the open position.

9. A racking mechanism for a drawout circuit breaker comprising: a cross shaft movably disposed in an enclosure; at least one input link in operable communication with the cross shaft and at least one transfer link; the at least one transfer link pivotably connected to the at least one input link; and at least one racking cam rotatably disposed in the enclosure and pivotably connected with the transfer link, each racking cam having at least one cam slot receptive of a portion of the circuit breaker, wherein a first movement of the cross shaft about a cross shaft axis causes a second movement of the at least one racking cam from an open position toward a closed position with the portion of the circuit breaker disposed in the at least one cam slot, thereby securing the circuit breaker in the enclosure when the circuit breaker is racked into the enclosure and the at least one racking cam is in the closed position, the at least one cam slot including: a first cam slot profile having a first moment arm, capable of accelerating the circuit breaker toward a connection face; a second cam slot profile having a second moment arm shorter than the first moment arm, capable of engaging the circuit breaker with the connection face; and a third cam slot profile having a substantially zero moment arm, capable of locking the circuit breaker in a desired position.

10. The racking mechanism of claim 9 including a drive unit capable of moving the cross shaft.

11. The racking mechanism of claim 10 wherein the drive unit includes: a racking screw; and at least one screw bearing slidably disposed in the enclosure, the at least one screw bearing operably connected to the racking screw and the cross shaft, wherein a third movement of the racking screw about a racking screw axis urges the screw bearing along the racking screw axis, thereby moving the cross shaft about the cross shaft axis.

12. The racking mechanism of claim 11 wherein the racking screw axis is substantially perpendicular to the cross shaft axis.

13. The racking mechanism of claim 9 wherein the third cam slot profile is substantially perpendicular to the cross shaft axis when the racking cam is in the closed position.

14. The racking mechanism of claim 9 wherein the at least one racking cam is moveably fixed to the enclosure via a cam mounting plate.

15. The racking mechanism of claim 14 wherein the cam mounting plate is removably fixed to the enclosure wherein removal of the cam mounting plate from the enclosure allows for removal of the circuit breaker from the enclosure without movement of the at least one racking cam from the closed position toward the open position.

16. A method for securing a circuit breaker into an enclosure comprising: moving a cross shaft disposed in the enclosure about a cross shaft axis; moving at least one input link, the at least one input link operably connected to the cross shaft, via a first movement of the cross shaft; engaging at least a portion of the circuit breaker in a cam slot of at least one racking cam, the at least one racking cam operably connected to the at least one input link via at least one transfer link, the at least one racking cam pivotably connected to the at least one transfer link, and the at least one transfer link pivotably connected to the at least one input link; moving the at least one racking cam from an open position toward a closed position, via a second movement of the at least one transfer link; and securing the circuit breaker to a connection face within the enclosure via a third movement of the racking cam.

17. The method of claim 16 wherein moving the cross shaft comprises: moving a racking screw disposed in the enclosure about a racking screw axis; urging at least one screw bearing toward the cross shaft, the screw bearing slidably disposed in the enclosure in operable communication with the racking screw such that the screw bearing is urged by a fourth movement of the racking screw; moving the cross shaft about the cross shaft axis, the cross shaft disposed in operable communication with the screw bearing such that urging of the screw bearing toward the cross shaft results in the first movement of the cross shaft.

18. The method of claim 16 wherein the racking screw axis is disposed substantially perpendicular to the cross shaft axis.

19. The method of claim 16 wherein securing the at least a portion of the circuit breaker to a connection face includes:
urging the at least a portion of the circuit breaker through a first profile of the cam slot thereby accelerating the circuit breaker toward the connection face;
urging the at least a portion of the circuit breaker through a second profile of the cam slot thereby engaging the circuit breaker with the connection face; and
urging the at least a portion of the circuit breaker into a third cam slot profile thereby locking the circuit breaker in a desired position.

20. The method of claim 17 wherein moving the at least one racking cam from an open position toward a closed position includes moving a connecting link operably connected to the input link and the racking cam, a fifth movement of the connecting link thereby urging the third movement of the racking cam.

21. A circuit breaker assembly comprising: an enclosure; a draw out circuit breaker insertable in the enclosure; and a racking mechanism including: a cross shaft rotatably disposed in the enclosure; at least one input link in operable communication with the cross shaft; and at least one racking cam rotatably disposed in the enclosure and in operable communication with the input link via at least one transfer link, the at least one racking cam pivotably connected to the at least one transfer link, and the at least one transfer link pivotably connected to the at least one input link, each racking cam having at least one cam slot receptive of a portion of the circuit breaker, wherein a first movement of the cross shaft about a cross shaft axis causes a second movement of the at least one racking cam from an open position toward a closed position with the portion of the circuit breaker disposed in the at least one cam slot, thereby securing the circuit breaker in the enclosure when the circuit breaker is racked into the enclosure and the at least one racking cam is in the closed position, the at least one cam slot including: a first cam slot profile having a first moment arm, capable of accelerating the circuit breaker toward a connection face; a second cam slot profile having a second moment arm shorter than the first moment arm, capable of engaging the circuit breaker with the connection face; and a third cam slot profile having a substantially zero moment arm, capable of locking the circuit breaker in a desired position.

22. The circuit breaker assembly of claim 21 including a drive unit capable of moving the cross shaft.

23. The circuit breaker assembly of claim 22 wherein the drive unit includes: a racking screw; and at least one screw bearing slidably disposed in the enclosure, the at least one screw bearing operably connected to the racking screw and the cross shaft, wherein a third movement of the racking screw about a racking screw axis urges the screw bearing along the racking screw axis, thereby moving the cross shaft about the cross shaft axis.

24. The circuit breaker assembly of claim 21 wherein the at least one racking cam is moveably fixed to the enclosure via a cam mounting plate.

25. The circuit breaker assembly of claim 24 wherein the cam mounting plate is removably fixed to the enclosure wherein removal of the cam mounting plate from the enclosure allows for removal of the circuit breaker from the enclosure without movement of the at least one racking cam from the closed position toward the open position.

* * * * *